United States Patent [19]

Cereghini

[11] 4,350,650

[45] Sep. 21, 1982

[54] METHOD FOR ADMIXING AT LEAST TWO LIQUIDS AND FEEDING THEM TO A SHAPING MOULD

[75] Inventor: Giuseppe Cereghini, Trento, Italy

[73] Assignee: Euro-Linea S.n.c. di Colombo & C., Trento, Italy

[21] Appl. No.: 219,964

[22] Filed: Dec. 24, 1980

Related U.S. Application Data

[63] Continuation of Ser. No. 2,180, Jan. 9, 1979, abandoned.

[51] Int. Cl.[3] ............ B29F 1/03

[52] U.S. Cl. ............ 264/39; 264/328.4; 264/328.6; 264/328.17; 264/328.18; 264/328.19; 366/267; 366/268

[58] Field of Search ............ 366/267, 268; 264/328.4, 328.6, 39, 328.17, 328.18, 328.19

[56] References Cited

U.S. PATENT DOCUMENTS

| | | | |
|---|---|---|---|
| 2,813,300 | 11/1957 | Hausman | 366/268 |
| 3,700,215 | 10/1972 | Hardman | 366/268 |
| 3,860,218 | 1/1975 | Hürliman | 366/268 |
| 3,913,892 | 10/1975 | Ersfeld | 264/328.6 |
| 4,043,486 | 8/1977 | Wisbey | 366/267 |

*Primary Examiner*—James H. Derrington
*Attorney, Agent, or Firm*—Oblon, Fisher, Spivak, McClelland & Maier

[57] ABSTRACT

A method is disclosed for intimately blending two liquid phases, such as is required, for example, in the plastics materials industry, the method including causing the two liquids to flow under throttled conditions through a nozzle after having been pressurized. The admixture is intimate and is obtained quickly, premature cross-linking and incrustation formation being thus effectively prevented.

1 Claim, 3 Drawing Figures

METHOD FOR ADMIXING AT LEAST TWO LIQUIDS AND FEEDING THEM TO A SHAPING MOULD

This is a continuation, of application Ser. No. 002,180, filed Jan. 9, 1979, now abandoned.

BACKGROUND OF THE INVENTION

FIELD OF THE INVENTION

In the technology of transformation of materials which starts from mixtures of liquids, also viscous ones, which are then injected or cast into hollow moulding spaces wherein they harden under certain conditions of cross-linking, with particular regards to mixtures of monomers, cross-linking agents, plasticizers, catalysts, active and inert fillers, dyestuffs and so forth, there are two discrete processing stages, viz. the intimate admixture of the components and the injection or casting operation, which generally take place in two discrete locations in the installation.

The circumstance that these processing stages are carried out in two discrete locations of the plant originates a number of shortcomings.

In the first place, the processing times are too long, then the machinery is very bulky, intricate and thus expensive, not only as regards the initial costs, but also the running and the upkeep costs.

Another serious defect of the conventional blending systems is that they adopt blenders of the dynamic type such as mills and the like, which are not always in a position to provide that satisfactory intimate admixture of the components which is required to shape certain compounds adequately in order that products exhibiting preselected properties may be obtained.

SUMMARY OF THE INVENTION

An object of the present invention is to redress certain shortcomings as outlined above by providing a method for admixing substance of a liquid nature and for feeding the thusly obtained admixture into a shaping mould, such method being capable of being carried out in the same portion of an installation and in sequential processing order without lag times.

Another object of the present invention is to provide such a method capable of bringing about an intimate admixture of the components such as cannot be obtained conventionally.

In order that the above indicated objects may be achieved, according to the present invention, it has been envisaged to provide a method for admixing at least two liquids and for feeding them into a shaping mould, such method being characterized in that it includes the steps of:

(a) causing a first liquid to flow under pressure within a closed loop by having the liquid flowing repeatedly through at least a throttling site for impressing to the liquid a laminar flow motion, and (b) causing to flow in the closed loop a second liquid under pressure, together with the first liquid, causing both to pass repeatedly through the throttling site, and (c) feeding the mixture obtained in the loop directly into a shaping mould situated downstream of the closed loop.

Another object of the present invention is to provide a device capable of appropriately performing the stages of the method outlined above.

To this purpose, according to the invention, it has been thought to embody a device including a cylindrical chamber for mixing the two liquids together and feeding them admixed to the mould, two counteracting pistons driven to slide within the chamber; a partition diaphragm inserted between the pistons so as to split the chamber into two compartments which communicate through at least one passageway through the diaphragm, feeding ducts for the liquids which open into the chamber, and a valve-controlled discharge nozzle for the liquid mixture.

BRIEF DESCRIPTION OF THE DRAWINGS

The features of the invention will become still more clearly apparent from the ensuing detailed description of an exemplary embodiment of the installation adopted to carry out the method, the installation being illustrated in the accompanying drawings, wherein.

DETAILED DESCRIPTION OF THE PREFERRED EMBODIMENTS

Figure 1:
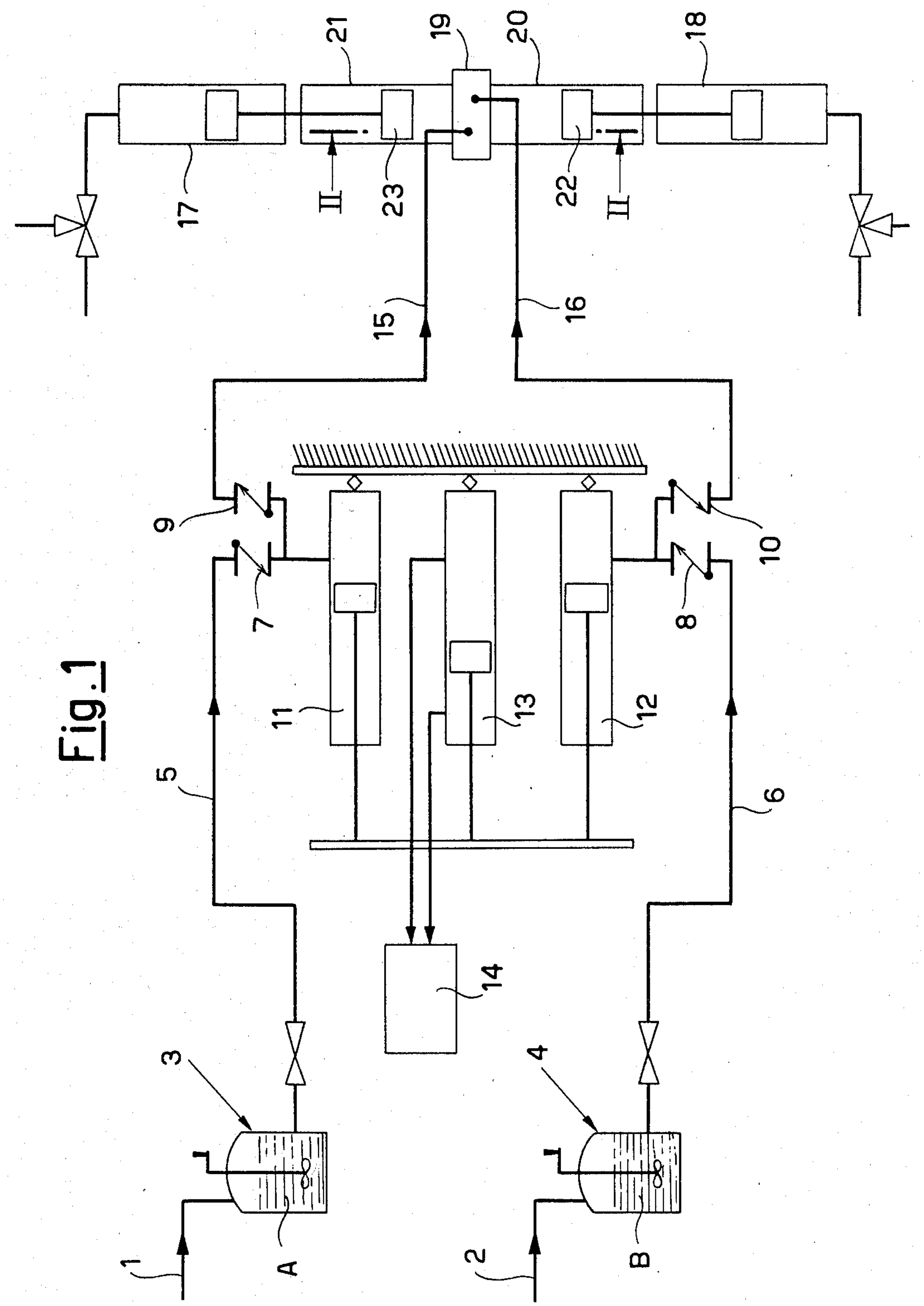
FIG. 1 is the operational layout of the installation.

FIG. 1 shows the diagram illustrating the principle of the processing installation, starting for example from the two components, A and B, as prepared in the storage tanks 3 and 4, wherefrom, by means of the dry air pressure impressed into the lines 1 and 2, they discretely reach the loading cylinders 11 and 12, via the lines 5 and 6, and through the nonreturn valves 7 and 8.

By displacing the pistons in the loading cylinders 11 and 12 by the agency of the hydraulic system composed by a central unit 14 and the cylinder 13, the chambers 20 and 21 of the injector-mixer of the present invention are filled via inlet passages 15 and 16.

The two charges A and B flow through the nonreturn valves 9 and 10. The injector mixer essentially includes the chambers 20 and 21 and a separation-admixture diaphragm or nozzle block 19, diagrammatically shown in FIG. 2.

The reciprocation of the pistons 22 and 23 in the same direction causes the materials which compose the batches to be blended to become intimately interdispersed. The pistons 22 and 23 are actuated by counterpistons contained in compressed air cylinders 17 and 18. Due to the actuation of the pistons 22 and 23 the batches flow through the passageway 24 of communication between the two chambers, in such a mode of flow as to have high values of the sliding velocity gradient.

The shear stress at the wall thus become greater, the higher the viscosities of the batches and of the mixture will be. Preferably, to this purpose, the passageway 24 includes two branches or branched passageways 26, 27 which converge into a mixture discharge nozzle 28.

In comparison with other static mixers, it has surprisingly been found that there is no necessity of splitting the streams into a number of fillets during the flow of the materials, but that it is sufficient to work under conditions of high shear stresses in order that a satisfactory intermixing of the batches to be mixed may be achieved.

Of course, the motion of reciprocation of the two pistons in the injection and admixture chamber takes place with the valves 9, 10 and 25 shut.

For the injection or casting of the admixed materials, the valve 25 is opened and the two pistons 22 and 23 are actuated either singly or together (consistently with the amount of material to be injected), so as to feed the mixture, through the nozzle 28, into the mould, which has been diagrammatically shown at S.

When charges subsequent to the first are carried out with unblended material, the latter acts as a diluent of possible incrustations due to premature cross-linking and/or stagnation of material, so that the succession of the charges permits to consider the system as self-cleaning, with apparent technical and economical advantage.

In this connection, it is preferred to feed and to subject to laminar flow through the passageway 24 the first batch, then to feed in the second batch and subjecting them to laminar flow together.

Figure 2:
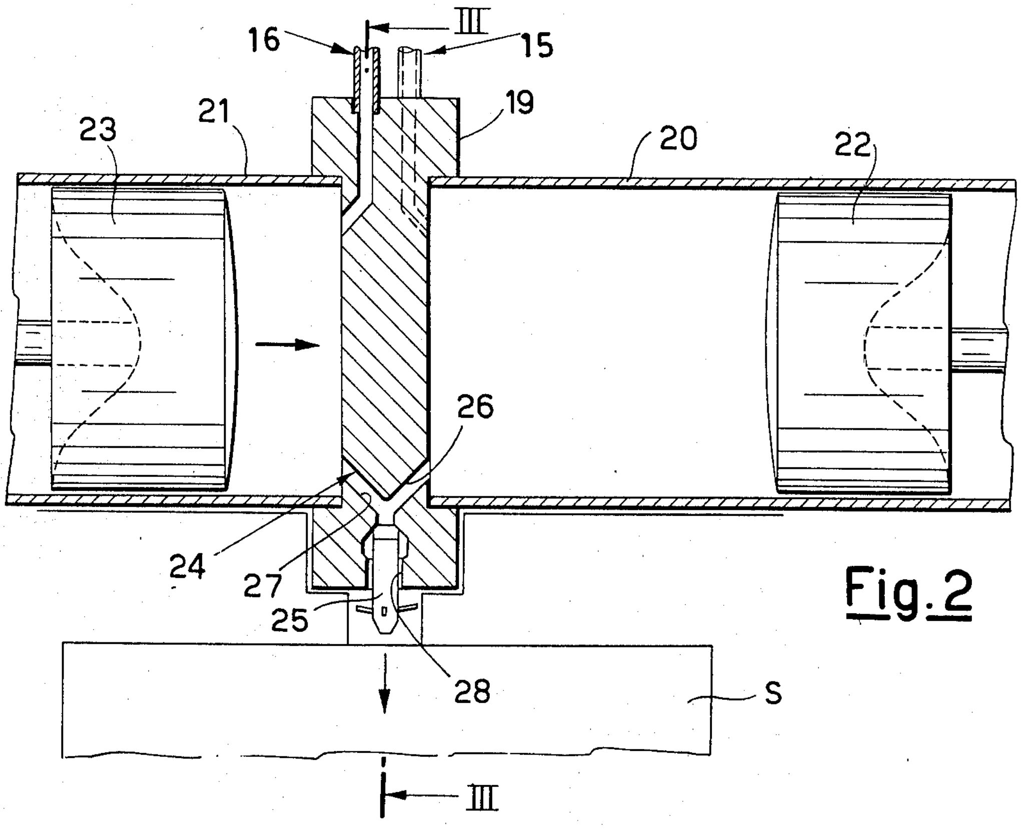
FIG. 2 is a longitudinal cross-sectional view showing the admixing device proper, the cross-sectional view being taken along the line II—II of FIG. 1.
Figure 3:
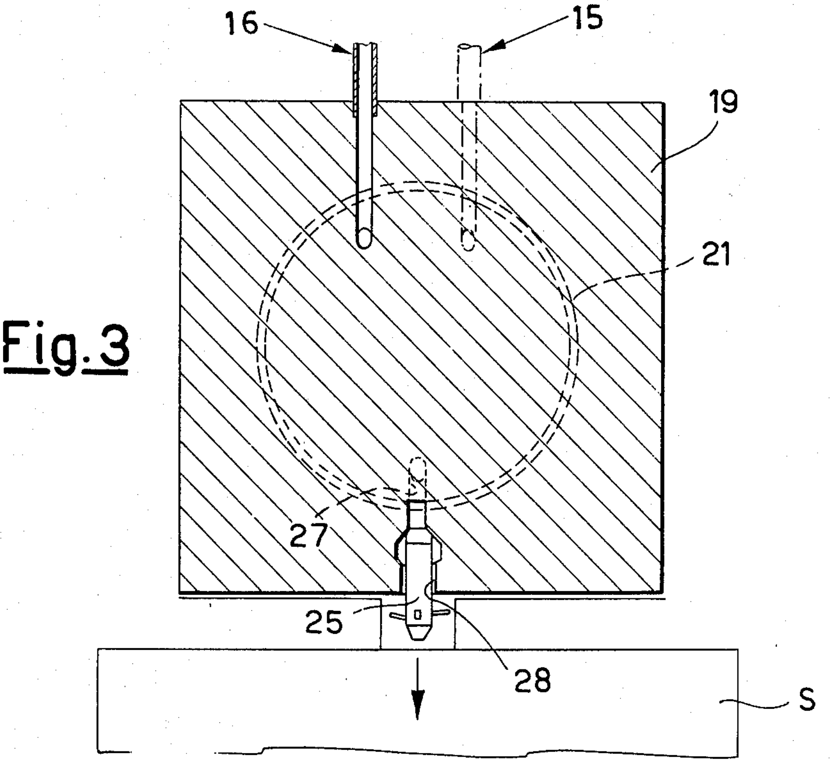
FIG. 3 is a cross-sectional view taken along the line III—III of FIG. 2.

With the apparatus shown in FIGS. 1, 2 and 3, there have been carried out process runs of polyurethane and the results are tabulated in the ensuing Examples.

EXAMPLE 1

Batch A is a polyurethane elastomer based on isocyanates of the kind of ADIPRENE L 100 (Reg. Trade Mark) of the DuPont Company, having the following properties:

| | |
|---|---|
| Specific gravity at 25° C. | 1.06 |
| Brookfield viscosity at 30° C. | 18.000 cps |
| Average isocyanate contents | 4.1% |

Batch B is a mixture of plasticizer, cross-linking agent and catalyst.

The plasticizer is DOP (dioctyl phthalate), the cross-linking agent is MOCA (Reg. Trade Mark) of DuPont (4,4'-methylene-bis-2-chloroaniline) and the catalyst is adipic acid.

The operative variable was taken as the increasing number of reciprocations of the pistons 22 and 23 in the opposite directions. While accepting the principle that the final characteristics are, as an average, those obtainable as maxima with the relative compounds, there have been statistically evaluated the coefficients of variation for tests repeated 20 times on the same sample, by detecting the decrease as a function of the number of reciprocations of the pistons and the constancy after the second movement. The values of the coefficients of variation have a magnitude which virtually corresponds to the errors of the measuring methods. This fact means that by actuating the pistons 22, 23 only twice prior to effecting the casting or the injection into the mould, a perfect homogenization of the blend is achieved.

The compound formulae and the results are tabulated hereunder.

| | | | | |
|---|---|---|---|---|
| Adiprene L 100 | 100 | 100 | 100 | 100 |
| Moca | 12.5 | 12.5 | 12.5 | 12.5 |
| DOP | 40 | 40 | 40 | 40 |
| Adipic acid | 0.15 | 0.15 | 0.15 | 0.15 |
| N° reciprocations | 1 | 2 | 3 | 10 |
| Admixing temperature, °C. | 100 | 100 | 100 | 100 |
| Cross-linking time, hrs | 3 | 3 | 3 | 3 |
| Temperature of | | | | |

-continued

| | | | | |
|---|---|---|---|---|
| cross-linking °C. | 100 | 100 | 100 | 100 |
| Post-cross-linking, hrs | 160 | 160 | 160 | 160 |
| Post-cross linking tempt. °C. | 24 | 24 | 24 | 24 |
| Hardness, Shore A | 81 | 82 | 81 | 81 |
| Modulus at 100% el.,kg/cm$^2$ | 37 | 37 | 38 | 37 |
| Modulus at 300% el.,kg/cm$^2$ | 60 | 62 | 61 | 60 |
| Tensile strength,kg/cm$^2$ | 205 | 210 | 212 | 210 |
| Elong.at break, % | 600 | 610 | 620 | 615 |
| Compression set, % | 40 | 41 | 39 | 40 |
| (22 hrs at 70° C.) | | | | |
| Resilience, % (Bashore) | 51 | 50 | 51 | 51 |
| VARIATION COEFFICIENTS in % | | | | |
| Hardness | 14 | 8 | 7 | 8 |
| Tensile strength | 16 | 10 | 8 | 9 |
| Resilience | 10 | 7 | 8 | 7 |

EXAMPLE 2

The same procedure of Example 1 has been adopted but a dyestuff has been added to the formulation (for example, in an epoxy base paste).

There have been obtained the same results as for Example 1.

The dyestuff has been admixed as a component of batch B and the microscopical analysis has shown that it had been finely dispersed.

EXAMPLE 3

The batch A is ADIPRENE L 100 (Reg. Trade Mark), the batch B is a mixture of DOP and methylene dianiline. The blending has been obtained with 1 and 3 reciprocations of the pistons.

| | | |
|---|---|---|
| ADIPRENE L 100 | 100 | 100 |
| DOP | 50 | 50 |
| Methylene dianiline | 9.6 | 9.6 |
| Admixture temperature, °C. | 66 | 66 |
| Time of removal from moulds, mins. | 3 | 3 |
| Cross-linking time at 100° C., hrs | 1 | 1 |
| Conditioning time UR 50%) at 24° C., hrs | 160 | 160 |
| Piston reciprocations, N° | 1 | 3 |
| Modulus at 100% el.kg/cm$^2$ | 40 | 39 |
| Modulus at 300% el.kg/cm$^2$ | 55 | 56 |
| Tensile strength, kg/cm$^2$ | 190 | 200 |
| Elong. at break, % | 600 | 630 |
| Hardness, Shore A | 73 | 73 |
| Compress.set(B), %, 22 hrs at 70° C. | 25 | 27 |
| Resilience (Bashore), % | 53 | 52 |
| COEFFICIENTS OF VARIATION, %: | | |
| Tensile strength | 20 | 10 |
| Elongation at break | 15 | 9 |
| Hardness | 20 | 8 |

EXAMPLE 4

Batch A is DIPRENE L 100 (Reg. Trade Mark) supplemented by ferric acetylacetonate as the catalyst.

Batch B is composed by ADIPRENE L 100 (Reg. Trade Mark) and polyols as cross-linking agents (1,4-butanediol and trimethylol propane).

The number of reciprocations of the pistons 22, 23 has been varied and the coefficients of variation has been calculated as for Example 1. The formulations and the results which have been obtained are tabulated hereunder:

| | | | | |
|---|---|---|---|---|
| ADIPRENE L 100 | 100 | 100 | 100 | 100 |
| 1,4-butanediol | 3.5 | 3.5 | 3.5 | 3.5 |
| Trimethylolpropane | 0.8 | 0.8 | 0.8 | 0.8 |
| Ferric acetylacetonate | 0.01 | 0.01 | 0.01 | 0.01 |

-continued

| | | | | |
|---|---|---|---|---|
| Cross-linking, hrs/°C. | 6 at 100 | 6 at 100 | 6 at 100 | 6 at 100 |
| Post cross-linking, hrs (U.R.50% at 24° C.) | 160 | 160 | 160 | 160 |
| Piston reciprocations, N° | 1 | 2 | 3 | 10 |
| Modulus at 100% el.kg/cm$^2$ | 19 | 20 | 18 | 19 |
| Modulus at 300% el.kg/cm$^2$ | 33 | 30 | 35 | 34 |
| Tensile strength, kg/cm$^2$ | 137 | 142 | 136 | 138 |
| Elong.at break, % | 500 | 480 | 510 | 500 |
| Shore A Hardness | 58 | 57 | 58 | 58 |
| COEFFICIENTS OF VARIATION IN %: | | | | |
| Tensile strength | 22 | 12 | 11 | 9 |
| Elongation at break | 18 | 8 | 9 | 8 |
| Hardness | 16 | 10 | 12 | 10 |

Thus, according to the invention, the admixture is effected by a static blender based on the flow of the materials through appropriate ports, under such conditions of flow as to provide a complete interpenetration or intermixing of the components by virtue of the shearing stresses which are thus generated. The absence of mechanical component parts in movement in the interior of the mass of the ingredients of the admixture prevents the formation of incrustations which would be caused by the permanence of materials around such parts as shafts, helices or otherwise. Such incrustations are often due to premature polymerizations or premature cross-linking as generated by differential stresses around moving shafts and by the stirring time as required in a usual dynamic blender to effect the admixture in question.

In the case in point the times which are required for effecting blending may be reduced to a few seconds, so that hardening phenomena are minimized prior to injection and it becomes possible to work at temperatures which are sufficiently high to minimize also the cross-linking cycles.

I claim:

1. A method for admixing at least two liquids and feeding them into a mould via first and second branched, converging throttling passageways formed in a nozzle block leading to a discharge passage and defining a first and second chamber which comprises the steps of:

feeding a first liquid through a first inlet passage into said first chamber;

circulating the first liquid under pressure between the first and second chambers through the throttling passageways to clean the chambers and passageways;

converging the first liquid through the first and second branched, converging passageways in the nozzle block for impressing on the liquid a laminar flow motion;

thereafter feeding a second liquid through a second inlet passage into said second chamber separated from the first chamber by said nozzle block;

circulating the first and second liquids back and forth under laminar flow from one to ten times in a closed loop between the first and second chambers;

converging the first and second liquids through the first and second branched, converging passageways in the nozzle block to thoroughly admix the first and second liquids and to generate a desirable sliding velocity gradient; and feeding the admixed liquids through said discharge passage in the nozzle block directly into said mould, thus preventing incrustations of the liquids in the first and second chambers and nozzle block.

* * * * *